US007617369B1

(12) United States Patent
Bezbaruah et al.

(10) Patent No.: US 7,617,369 B1
(45) Date of Patent: *Nov. 10, 2009

(54) FAST FAILOVER WITH MULTIPLE SECONDARY NODES

(75) Inventors: Angshuman Bezbaruah, Range Hills (IN); Anand A. Kekre, Baner (IN); Niranjan S. Pendharkar, Maharashtra (IN)

(73) Assignee: Symantec Operating Corporation, Cupertino, CA (US)

( * ) Notice: Subject to any disclaimer, the term of this patent is extended or adjusted under 35 U.S.C. 154(b) by 705 days.

This patent is subject to a terminal disclaimer.

(21) Appl. No.: 10/728,027

(22) Filed: Dec. 4, 2003

Related U.S. Application Data

(63) Continuation-in-part of application No. 10/610,139, filed on Jun. 30, 2003.

(51) Int. Cl.
| | |
|---|---|
| G06F 12/00 | (2006.01) |
| G06F 13/00 | (2006.01) |
| G06F 13/28 | (2006.01) |
| G06F 11/00 | (2006.01) |
| G06F 17/30 | (2006.01) |

(52) U.S. Cl. .................... 711/162; 711/161; 714/6; 707/200; 707/201; 707/202; 707/203; 707/204

(58) Field of Classification Search ............ None
See application file for complete search history.

(56) References Cited

U.S. PATENT DOCUMENTS

| | | | | |
|---|---|---|---|---|
| 6,591,351 | B1 * | 7/2003 | Urabe et al. | 711/162 |
| 6,671,705 | B1 * | 12/2003 | Duprey et al. | 707/204 |
| 2003/0145179 | A1 * | 7/2003 | Gabber et al. | 711/162 |
| 2003/0172316 | A1 * | 9/2003 | Tremblay et al. | 714/7 |

* cited by examiner

*Primary Examiner*—Christian P Chace
*Assistant Examiner*—Gary W Cygiel
(74) *Attorney, Agent, or Firm*—Campbell Stephenson LLP

(57) ABSTRACT

A method, system, computer system, and computer program product to quickly synchronize replicas of data stored at multiple secondary nodes upon failure of a primary node. Secondary nodes to which an update to data is sent are identified. The secondary nodes insert the update into a respective log of updates to a respective copy of the data. When all of the secondary nodes have acknowledged the update, a notification is sent to each of the secondary nodes. In response to receiving the notification, each of the secondary nodes clears the update from the respective log. Data at one secondary node can be synchronized with data at another secondary node when one of the nodes has received updates from the primary node that the other secondary node has not yet received.

17 Claims, 10 Drawing Sheets

*Asynchronous Replication*

*Synchronous Replication*

*Asynchronous Replication*

*Simultaneous Asynchronous and Synchronous Replication*

Storage Replication Log

*Storage Replication Log*

FAST FAILOVER WITH MULTIPLE SECONDARY NODES

CROSS REFERENCE TO RELATED APPLICATION

This application is a continuation-in-part of U.S. patent application Ser. No. 10/610,139, entitled "Fast Failover with Multiple Secondary Nodes," filed Jun. 30, 2003, and naming as inventors Angshuman Bezbaruah, Anand A. Kekre, and Niranjan S. Pendharkar, the application being incorporated by reference herein in its entirety for all purposes.

COPYRIGHT NOTICE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to quickly enabling one of several secondary nodes to provide the functionality of a failed primary node while maintaining data consistency on all nodes.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One strategy includes replicating data from local computer systems to backup local computer systems and/or to computer systems at remote sites. Because disk storage volumes are common types of storage areas that are replicated, the term "storage area" is used interchangeably with "storage volume;" however, one of skill in the art will recognize that the replication processes described herein are also applicable to other types of storage areas and that the use of the term "storage volume" is not intended to be limiting.

Storage area replication is used to maintain online duplicate copies of some storage areas, such as disk volumes. The original storage area is called the primary, and the duplicate is called the replica. Replication tries to ensure that the secondary volume contains the same data, block by block, as in the primary volume, while the primary volume is in active use. The replica server and primary server may communicate over a network channel.

To accommodate the variety of business needs, some replication facilities provide remote mirroring of data and replicating data over a wide area or distributed network such as the Internet. However, different types of storage typically require different replication methods. Replication facilities are available for a variety of storage solutions, such as database replication products and file system replication products, although typically a different replication facility is required for each type of storage solution. Other replication facilities are available for replicating all contents of a particular type of storage device.

In case of failure of a server maintaining the primary storage area, applications using the primary storage area can be moved to a replica server under control of external "failover" software; this process is also referred to as a "failover." Preferably, failover is performed as quickly as possible to ensure high availability of enterprise data and continued functionality of enterprise systems.

Replication facilities provide such functionality as enabling a primary and secondary node to reverse roles when both are functioning properly. Reversing roles involves such replication operations as stopping the application controlling the replicated data, demoting the primary node to a secondary node, promoting the original secondary node to a primary node, and re-starting the application at the new primary node. Another example of functionality of a replication facility involves determining when a primary node is down, promoting the secondary node to a primary node, enabling transaction logging and starting the application that controls the replicated data on the new primary node. In addition, when the former primary node recovers from failure, the replication facility can prevent the application from starting at the former primary node since the application is already running at the newly-promoted node, the former secondary node. The transaction log can be used to synchronize data at the former and new primary nodes.

Replication of data can be performed synchronously, asynchronously, or periodically. With synchronous replication, an update is posted to the secondary node and acknowledged to the primary node before notifying the initiating application at the primary node that the update is complete. In the event of a disaster at the primary node, data can be recovered from the secondary node without any loss of data because the copies of the data at the primary and secondary nodes contain the same data. However, synchronous replication of data can be unacceptably slow in many enterprises with large amounts of data, very busy networks, and/or networks with high communication overhead due to long distances between nodes.

With asynchronous replication, updates to data are immediately reflected at the primary node and are queued to be forwarded to each secondary node. The initiating application is notified that the update is complete when the update is written to a storage location at the primary node. Data at the secondary node differs from data at the primary node during the period of time in which a change to the data is being transferred from the primary node to the secondary node. A decision regarding whether to replicate data synchronously or asynchronously depends upon the nature of the application program using the data as well as numerous other factors, such as available bandwidth, network round-trip time, the number of participating servers, and the amount of data to be replicated.

Under normal circumstances, updates, also referred to herein as writes, are sent to the secondary node in the order in which they are generated at the primary node when replication is performed asynchronously or synchronously. Consequently, the secondary node represents a state of the primary node at a given point in time. If a secondary node takes over due to a disaster, the data storage areas on the secondary nodes can be synchronized.

A replica that faithfully mirrors the primary currently is said to be synchronized or "in sync;" otherwise, the replica is said to be unsynchronized, or "out of sync." An out of sync replica may be synchronized by selectively or completely copying certain blocks from the primary; this process is called synchronization or resynchronization.

Whether synchronous or asynchronous replication is used, volume replication software can begin to work only after an initial set-up phase where the replica is synchronized with the primary volume. A volume replication facility is set up to prepare a replica of a primary storage volume. Another storage volume, of the same capacity as the primary storage volume, is configured on a separate server. Data are copied from the primary storage volume to the replica storage volume via a communication network between the primary and replication server. Initial synchronization of two storage areas can be a time consuming process, especially for large volumes or slow networks.

After initial replica synchronization, a subsequent write operation being performed on the primary volume can be copied by the replication facility while the subsequent write operation is being performed. A copy of the data being written is sent over the network to be written to the replica volume. This process keeps the primary and the replica volume synchronized as closely as possible. However, problems such as network connectivity failure or host failure may cause the replica volume to become unsynchronized. In such a case, the primary volume and replica volume must be resynchronized.

In some business-critical environments, multiple replicas are maintained on multiple secondary nodes because of the need for high availability of the software and/or data. To ensure data consistency upon primary node failure, data on the secondary nodes must be synchronized before restarting an application managing the data. Because of the uncertainty of the state of the secondary nodes, often one of the secondary nodes is selected as having the data to be used to synchronize the other nodes, and data are copied from the selected secondary node to the other secondary nodes. Unfortunately, synchronization is often performed by copying all blocks of the selected data to the other secondary nodes. Only when the synchronization is complete can the failover process be completed.

What is needed is a solution that enables a secondary node to assume the role of a failed primary node with as little effect on performance as possible. The solution should enable data on multiple secondary nodes to be quickly synchronized across a network or locally so that functionality and data provided by the failed primary node can be resumed as quickly as possible.

SUMMARY OF THE INVENTION

The present invention includes a method, system, computer program product, and computer system that quickly synchronize replicas of data stored at multiple secondary nodes upon failure of a primary node. In one embodiment, the method includes identifying secondary nodes to which an update to data is sent. At least one of the secondary nodes inserts the update into a respective log of updates for a respective copy of the data. When all of the secondary nodes have acknowledged the update, a notification is sent to each of the secondary nodes. In response to receiving the notification, the secondary nodes clear the update from their respective logs.

Synchronization may be performed upon primary node failure, at set intervals, or in response to a synchronization command. In one embodiment, synchronizing the data between secondary nodes involves determining that 'next update' or 'end of log' pointers in the logs on two secondary nodes differ. A set of updates is identified in the log having the most recently updated data, wherein each update of the set of updates is not in the log for the other secondary node. Data for the two secondary nodes are synchronized by applying the set of updates to the respective copy of the data on the other secondary node.

BRIEF DESCRIPTION OF THE DRAWINGS

The present invention may be better understood, and its numerous objectives, features and advantages made apparent to those skilled in the art by referencing the accompanying drawings.

The use of the same reference symbols in different drawings indicates similar or identical items.

DETAILED DESCRIPTION

Figure 1A:
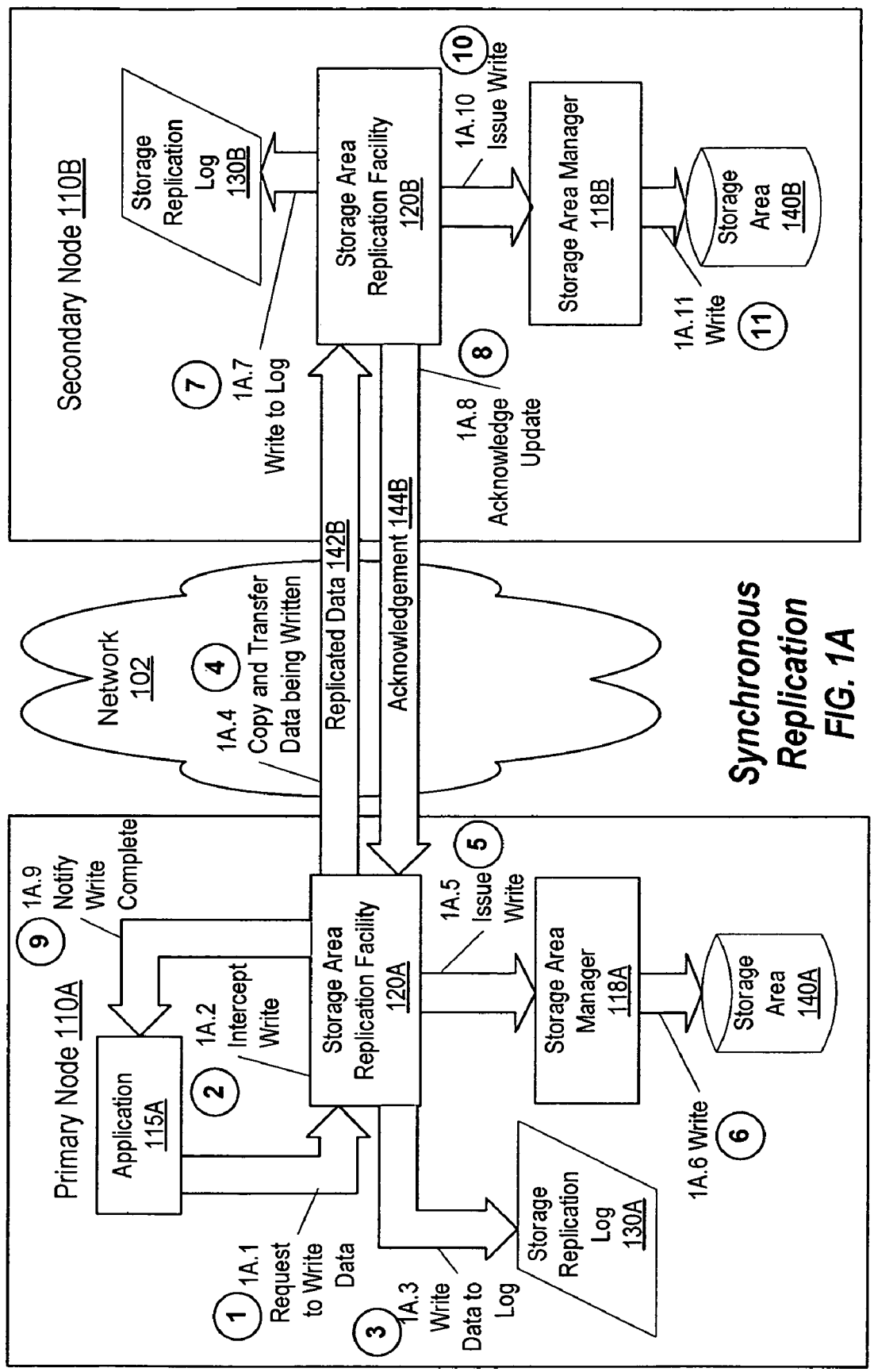
FIG. 1A is a diagram of a system for replicating data from a primary to a secondary node showing synchronous replication actions.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention includes a method, system, computer program product, and computer system that synchronize data maintained on multiple secondary nodes upon failure of a primary node.

In the environment described above, data from a primary node are replicated to maintain a consistent copy of data at a secondary node. Typically, a secondary node is remote from the physical location of the primary node and can be accessed via a network, although it is not a requirement that the secondary node be physically remote. Each of the primary and secondary nodes may be part of a cluster in which multiple computer systems are configured to serve either as an active node or a backup node for the cluster.

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for replicating the data worldwide.

Each replication primary node can have more than one replication secondary node. As used herein, a reference to the secondary node implicitly refers to all secondary nodes associated with a given primary node because, typically, the same replication operations are performed on all secondary nodes.

Replication is unidirectional for a given set of data. Writes of data on the primary node are sent to the secondary nodes, but access to the data at the secondary nodes is typically read-only. If read/write access to a secondary set of data is required (after a primary node failure, for example), replication can be halted for that set of data or a snapshot of the secondary set of data can be made while continuing replication. If data are then written to storage areas on secondary nodes, a synchronization process can be performed when the primary node becomes available again so that both sets of data are again identical before resuming replication of data.

Application data should not be allowed to enter a state in which the failure of the network or the primary node would leave that application data in an inconsistent and unusable state. During normal operation, data loss can be prevented by logging all writes and ensuring that writes to the log are complete before attempting any writes to the primary and secondary data storage areas.

The unit of storage in a given storage area is referred to herein as a "block," as block terminology is typically used to describe units of storage of disk volumes. Again, one of skill in the art will recognize that the unit of storage can vary according to the type of storage area, and may be specified in units of bytes, ranges of bytes, files, or other types of storage objects. The use of the term "block" herein is not intended to be limiting and is used herein to refer generally to any type of storage object. Similarly, data may be referred to herein as being replicated block by block or region by region, but any unit of storage may be replicated; for example, a file replication facility that replicates updates to files is within the scope of the invention.

Some types of storage areas, such as disk volumes, store data as a set of blocks. Each block is typically of a fixed size; a block size of 512 bytes is commonly used. Thus, a volume of 1000 Megabyte capacity contains 2,048,000 blocks of 512 bytes each. Any of these blocks can be read from or written to by specifying the block number (also called the block address). Typically, a block must be read or written as a whole.

Data consistency is ensured by coordinating operations such that they occur in the same order on each secondary node as on the primary node. Consequently, data storage modifications occur in the same order on both the secondary and the primary node. Data consistency does not necessarily require an exact ordering of every write operation; for example, simultaneous write operations that do not depend upon one another can be completed in either order. Such simultaneous write operations may be referred to as "generations" or "batches" of write operations that need not be performed in a given order. To maintain write order consistency, the critical consideration is that one write operation that is issued after another write operation is completed should not be allowed to complete prior to the other write operation on the secondary node.

If a primary or secondary node fails, recovery includes locating the last entry that had not yet been acknowledged by the secondary node as having been successfully written, before the failure. Operation can continue from that point. However, a set of requests may exist between the last acknowledged request and the last request that was sent to the replicated storage area before the failure. The data changed in this set of requests may or may not have been written to the secondary node data storage areas.

If the primary node fails, some update and any log information on the primary node is lost, and generally the secondary node takes over as a primary node with data as it existed at an earlier point in time. However, if the primary node does not fail, but is unable to communicate with the secondary node due to failure of the network and/or of the secondary node, the primary node continues to log updates. In some situations, the primary node may also lock the addresses of all blocks or storage objects from which an acknowledgement was not received from the secondary node. Now the replica is out of sync, and the replica must be resynchronized using the logged data before normal replication can resume. Normal replication ensures that the result of each write operation to data on the primary node is replicated to each secondary node, which is sometimes referred to as "copy-on-write" replication. If addresses of blocks or storage objects that were not acknowledged are not logged, a full synchronization must be performed.

FIG. 1A shows a detailed view of a configuration for replication management. Primary node 110A and secondary node 110B can be implemented as computer systems as are known in the art, including a processor (not shown) for executing instructions and a memory (not shown) for storing the instructions, as an integrated circuit (e.g., an FPGA (Field Programmable Gate Array) or ASIC (Application Specific Integrated Circuit) configured to perform the functionality of such instructions, or any mechanical device configured to perform such functions. Computer systems, including computer systems in the form of network appliances configured to perform tasks such as replication, are described in further detail with reference to FIG. 6 below.

Primary node 110A includes an application program 115A. Application program 115A can be a database, a file system, or a user-level application program. The present invention operates independently of the type of data and/or unit of storage of the data. Storage area manager 118A and storage area replication facility 120A obtain data to be written from application program 115A. Storage area replication facility 120A stores the data in storage area 140A via storage area manager 118A, which communicates directly with storage hardware for storage area 140A. It is within the scope of the invention that storage area 140A can include multiple storage objects, such as individual blocks making up a storage volume disk.

Secondary node 110B can include corresponding copies of application 115A (not shown). These respective copies can perform the functions of primary node 110A in the event of disaster, although none of these programs must be executing for performing replication or synchronization in accordance with the present invention. Alternatively, programs and other files associated with application, database and/or file system may be stored in a data storage area on the primary node and replicated along with the data. Should the secondary node itself need to manage the data, the programs and other files can be extracted from the replicated data and executed at the secondary node.

Corresponding copies of storage area manager 118A and storage area replication facility 120A also reside on secondary node 110B, respectively, storage area manager 118B and storage area replication facility 120B. These copies enable secondary node 110B to perform functions similar to those performed at primary node 110A and to manage storage areas and replicate data to other secondary nodes if necessary.

Shown in FIG. 1A are actions for a synchronous write operation. Action numbers for actions and sets of actions described in FIGS. 1A through 1E are provided as encircled text for the reader's convenience. Assume that data in storage area 140A on node 110A and storage area 140B on node 110B are initially synchronized. In action 1A.1, application 115A requests storage area manager 118A to write data. However, in action 1A.2, storage area replication facility 120A intercepts the write command on its way to storage area manager 118A. Storage area replication facility 120A writes the data to storage replication log 130A in action 1A.3. In the embodiment of the invention described herein, storage replication logs are used on both the primary and secondary nodes to enable multiple secondary nodes to be consistent and fast failover to occur when a primary node fails.

In action 1A.4, storage area replication facility 120A copies the data to be written by storage area manager 118A, referred to as replicated data 142B, and initiates a transfer of replicated data 142B to storage area 140B. In action 1A.5, storage area replication facility 120A asynchronously issues a write command to storage area manager 118A to write the data to storage area 140A. It is within the scope of the invention that writing data to a log, writing data to a local storage area, and sending data to a secondary node (respectively, actions 1A.3, 1A.4, and actions 1A.5) may start and/or complete in any order and may be performed in parallel. In some embodiments, it is preferable to complete writing data to the log before beginning to copy the data to secondary nodes; in other embodiments, for example, where a storage replication log is also used on secondary node 110B, action 1A.3 to write the data to the log can be performed in parallel.

In action 1A.6, storage area manager 118A writes the data to storage area 140A. Because the updated data resulting from the write operation is sent to a node that is updated synchronously, storage area replication facility 120A waits until an acknowledgement is received from storage area replication facility 120B before notifying application 115A that the write operation is complete.

Data transfer is typically performed over a communication link, such as network 102, between the primary and secondary nodes. Upon receiving replicated data 142B, in action 1A.7, storage area replication facility 120B on node 110B writes the update received to storage replication log 130B. In action 1A.8, storage area manager replication facility 120B sends acknowledgement 144B indicating that the update has been received on node 110B. Upon receiving acknowledgement 144B, storage area replication facility 120A on primary node 110A notifies application 115A that the write operation is complete. The synchronous write operation is then complete with respect to secondary node 110B.

If more than one secondary node is synchronously replicated, then storage area replication facility 120A waits until acknowledgements are received from all secondary nodes before notifying application 115A that the write operation is complete.

On secondary node 110B, after acknowledging receipt of the update in action 1A.8, storage area replication facility 120B issues a write command to storage area manager 118B in action 1A.9. action 1A.9, storage area manager replication facility 120B sends acknowledgement 144B indicating that the update has been received on node 110B. Note that storage area replication facility 120B is not shown writing data to a log, such as storage replication log 130A of primary node 110A. However, it is within the scope of the invention that secondary nodes, such as secondary node 110B, may also write data to a log and/or memory buffer and acknowledge receipt of the data when the data are written to the log and/or memory buffer. In such a case, i. It is possible that the acknowledgement in action 1A.8 may be performed in parallel with the write to the actual storage area 140B in actions 1A.107 and 1A.118. Furthermore, it is not necessary that write operation performed in actions 1A.5 and 1A.6 on primary node 110A be performed before the write operations performed in actions 1A.10 and 1A.11 on secondary node 110B; these operations may be performed in either order.

Figure 1B:
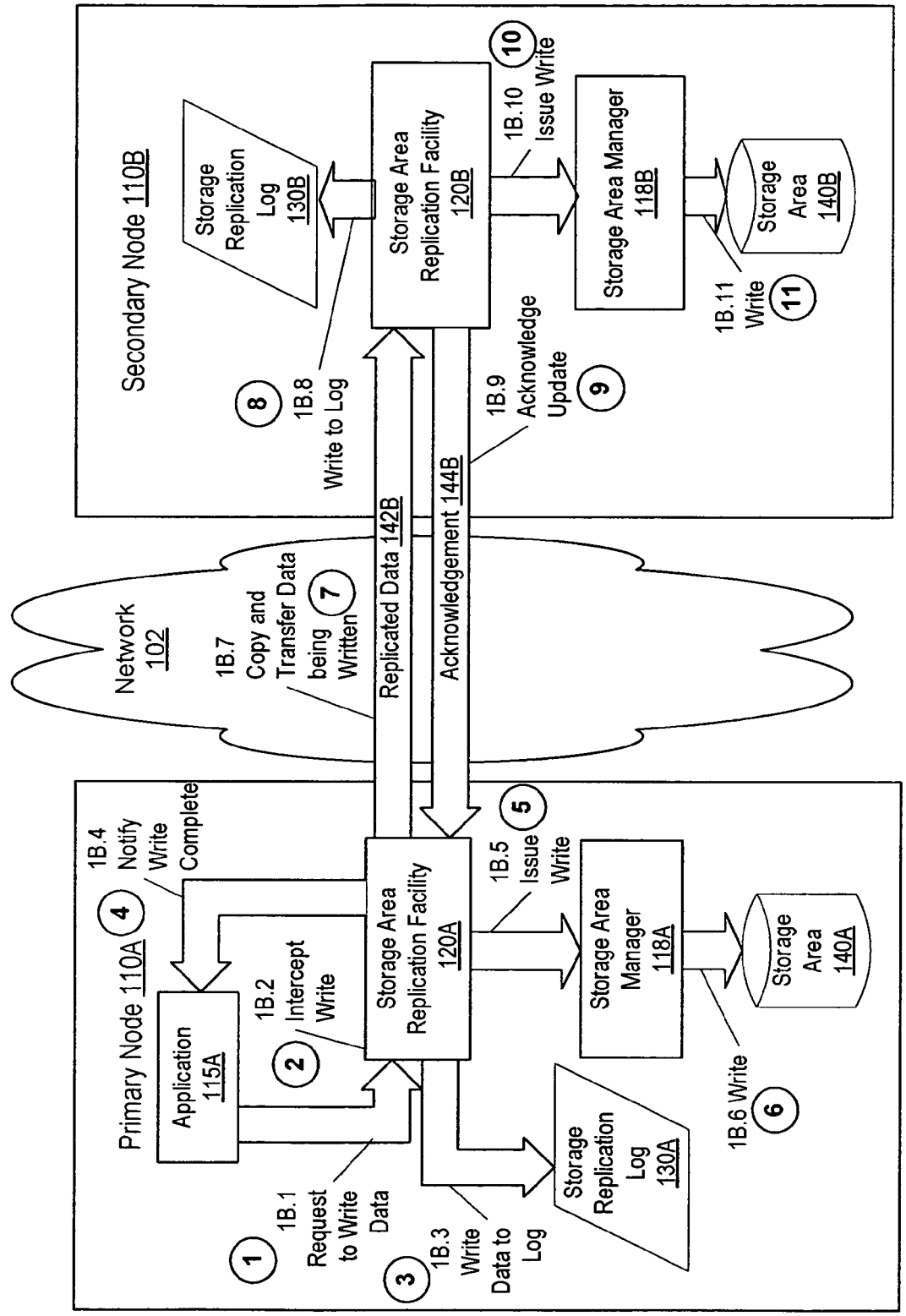
FIG. 1B shows asynchronous replication in the system of FIG. 1A.

Referring to FIG. 1B, asynchronous replication in the environment of FIG. 1A is shown. Again assume that the data in storage area 140A on node 110A and storage area 140B on node 110B are synchronized. In action 1B.1, application 115A requests storage area manager 118A to write data. In action 1B.2, storage area replication facility 120A intercepts the write command on its way to storage area manager 118A, and in action 1B.3, storage area replication facility 120A writes the data to storage replication log 130A. In action 1B.4, storage area replication facility 120A notifies application 115A that the write operation is complete. In contrast to FIG. 1A, this notification is sent without receiving an acknowledgement from storage area replication facility 120B because data are being replicated to secondary node 110B asynchronously. In action 1B.5, storage area replication facility 120A issues a write command to storage area manager 118A, and in action 1B.6, storage area manager 118A writes the updated data to storage area 140A. In action 1B.7, storage area replication facility 120A copies the data to be written by storage area manager 118A, referred to as replicated data 142B, and transfers replicated data 142B to storage area replication facility 120B on secondary node 110B.

As described with reference to FIG. 1A, it is within the scope of the invention that writing data to a log, initiating a write of data to a local storage area, and sending data to a secondary node (respectively, actions 1B.3, 1B.5, and actions 1B.7) may start and/or complete in any order and may be performed in parallel. It is necessary with asynchronous replication, however, that action 1B.3, writing data to a log, is performed before action 1B.4, notifying application 115A that the write operation is complete.

Upon receiving replicated data 142B, in action 1B.8, storage area replication facility 120B on node 110B writes the update to storage replication log 130B in action 1B.8. In action 1B.9, storage area replication facility 140B sends acknowledgement 144B to storage area replication facility 140A on node 110A. In action 1B.10, storage area replication facility 120B issues a write command to storage area manager 118B. In action 1B.11, storage area manager 118B writes the updated data to storage area 140B. The asynchronous write operation is then complete with respect to secondary node 110B.

Figure 1C:
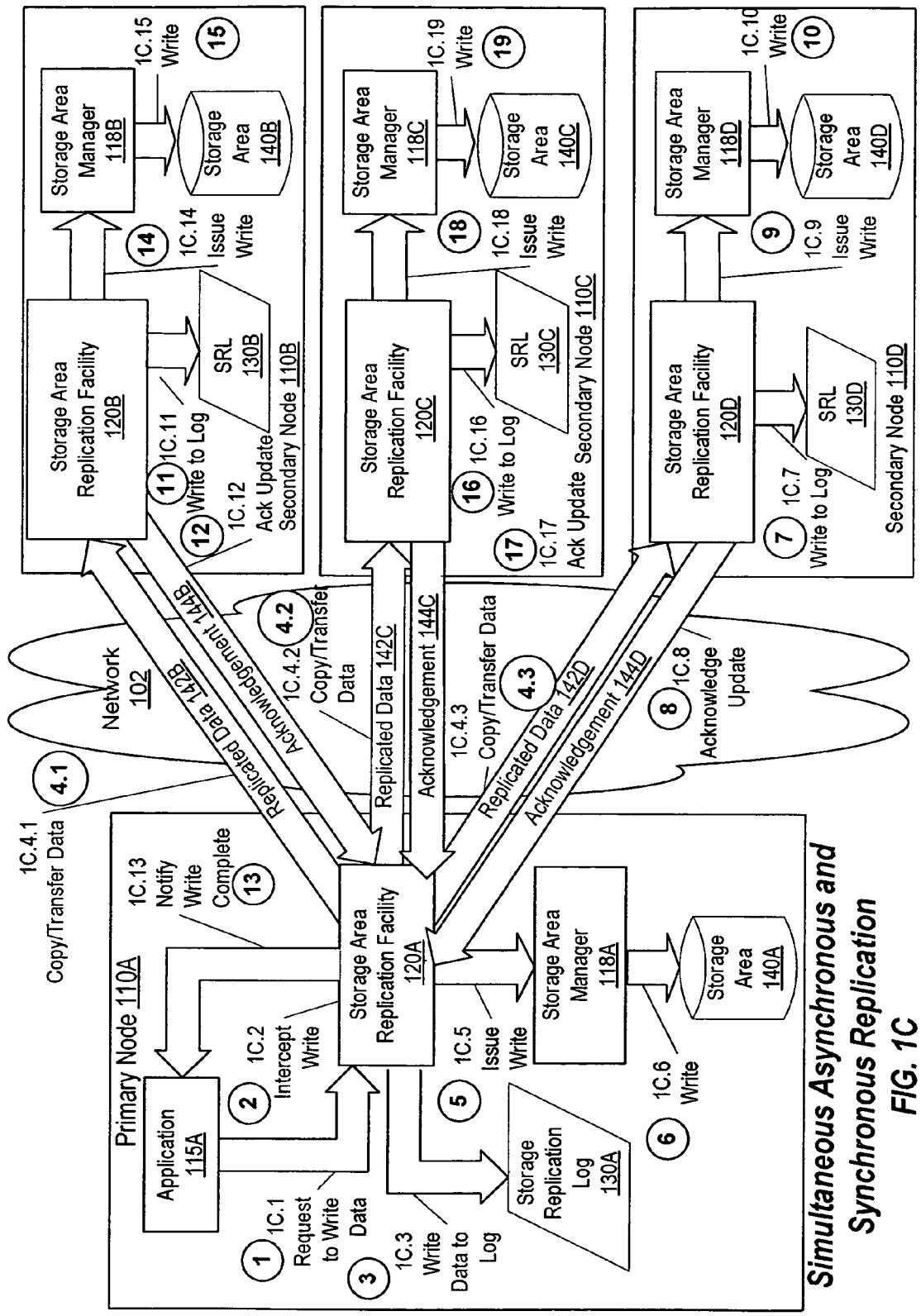
FIG. 1C shows simultaneous synchronous and asynchronous replication to multiple secondary nodes.

FIG. 1C shows replication to multiple secondary nodes simultaneously in the environment of FIG. 1A (now having two additional secondary nodes, 110C and 110D), with synchronous and asynchronous write operations occurring in parallel. Data are replicated to node 110B synchronously and to nodes 110C and 110D asynchronously. Assume that data in storage areas 140A, 140B, 140C, and 140D are initially synchronized. In action 1C.1, application 115A requests storage area manager 118A to write data. In action 1C.2, storage area replication facility 120A intercepts the write command on its way to storage area manager 118A. In action 1C.3, storage area replication facility 120A writes the update to storage replication log 130A. In actions 1C.4.1, 1C.4.2, and 1C.4.3, storage area replication facility 120A copies the data to be written by storage area manager 118A for each secondary node, referred to as replicated data 142B, 142C, and 142D, and initiates transfer to secondary nodes 110B, 110C and 110D. Because the write operation to node 110B is synchronous, storage area replication facility 120A waits until an acknowledgement is received from secondary node 110B before notifying application 115A that the write operation is complete.

In action 1C.5, storage area replication facility 120A on node 110A issues a write command to storage area manager 118A. In action 1C.6, storage area manager 118A writes the data to storage area 140A. Again, writing data to a log, initiating a write of the data to a local storage area, and sending data to a secondary node (respectively, actions 1C.3, 1C.5, and 1C.4,1, 1C.4.2, 1C.4.3) may start and/or complete in any order and may be performed in parallel.

Storage area replication facilities 120B, 120C, and 120D may receive the replicated data at different times depending upon network traffic between nodes. Therefore, secondary storage areas 140B, 140C, and 140D may be updated at different points in time and in any order.

In the example of FIG. 1C, secondary node 110D receives replicated data 142D first. Upon receiving replicated data 142D, in action 1C.7, storage area replication facility 120D on node 110D writes the update to storage replication log (SRL) 130D. In action 1C.8, storage area replication facility 120D sends acknowledgement 144D indicating that the replicated data 142D are received at secondary node 110D. In action 1C.9, storage area replication facility 120D issues a write command to storage area manager 118D. In action 1C.10, storage area manager 118D writes the data to storage area 140D. The write operation is complete with regard to node 110D, but not with regard to secondary nodes 110B and 110C. Upon receiving acknowledgement 144D, storage area replication facility 120A on node 110A does not notify application 115A that the write operation is complete because storage area replication facility 120A is waiting for an acknowledgement from storage area replication facility 120B on secondary node 110B.

The example of FIG. 1C shows that storage area replication facility 120B on node 110B receives replicated data 142B next. Upon receiving replicated data 142B, in action 1C.11, storage area replication facility 120B on node 110B writes the update to storage replication log (SRL) 130B. In action 1C.12, storage area manager 118B sends acknowledgement 144B indicating that replicated data 142B are received at secondary node 110B. The synchronous write operation is then complete with respect to secondary node 110B, and in action 1C.13, storage area replication facility 120A on primary node 110A notifies application 115A that the write operation is complete. In action C.14, storage area replication log 120B on secondary node 110B issues a write command to storage area manager 118B. In action 1C.15, storage area manager 118B writes the update to storage area 140B.

In the example of FIG. 1C, secondary node 110C receives replicated data 142C next. Upon receiving replicated data 142C, in action 1C.16, storage area replication facility 120C on node 110C writes the update to storage replication log (SRL) 130C. In action 1C.17, storage area replication facility 120C sends acknowledgement 144C indicating that the write operation is complete on node 110C. In action 1C.18, storage area replication facility 120C issues a write command to storage area manager 118C. In action 1C.19, storage area manager 118C writes the data to storage area 140C. The replicated data have been acknowledged by each of the three secondary nodes 110B, 110C, and 110D.

Assume that primary node 110A fails after the write operation in action 1C.10, when storage area 140D is updated but storage areas 140B and 140C are not yet updated. As the most recently updated secondary node, node 110D has the current version of the data, but is unsynchronized with the other secondary nodes. Prior to the invention, a typical synchronization operation copied all blocks of one of the secondary storage areas to the other secondary storage areas so that the data are consistent before restarting application 115A managing the data on one of the former secondary nodes. However, block-by-block copying of every block can be very time consuming and bandwidth-intensive, and can delay resuming operations and waste resources. The present invention overcomes these limitations through the coordinated use of the storage replication logs on secondary nodes, such as storage replication logs 130B, 130C and 130D of FIG. 1C.

Figure 2:
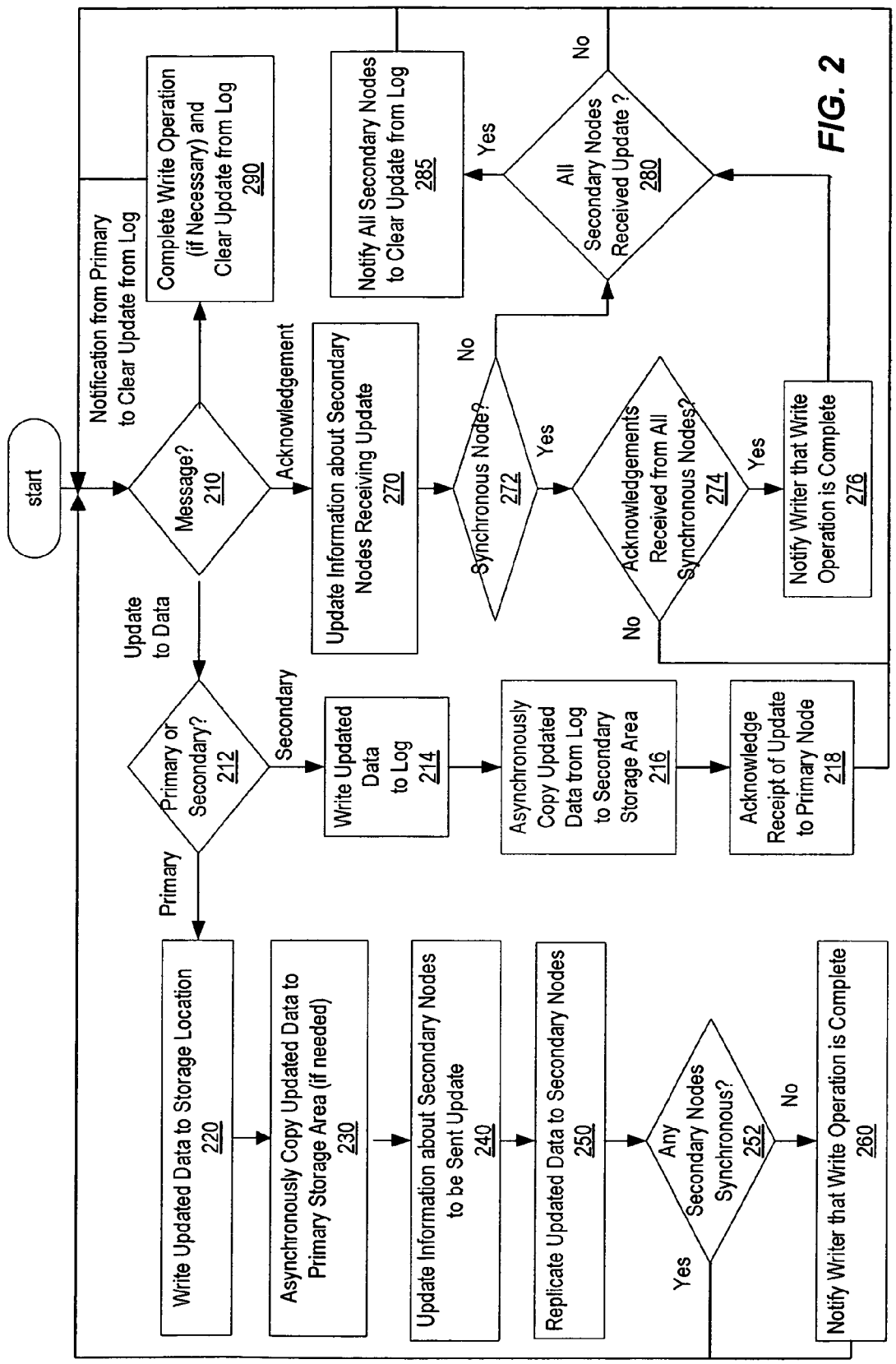
FIG. 2 is a flowchart of the actions performed by a replication facility operating in accordance with one embodiment of the present invention.

FIG. 2 is a flowchart of the actions performed by a replication facility operating in accordance with the present invention. At "Message?" decision point 210, the replication facility waits for messages. When a message is received and the message is an update to data (such as the update made in action FIG. 1A action 1A.1), the receiving instance of the replication facility can be operating on either a primary node or a secondary node. Control proceeds to "Primary or Secondary" decision point 212, where a determination is made whether the current node is a primary node or a secondary node. If the node is a primary node, control proceeds to "Write Updated Data to Storage Location" step 220. In the embodiments of the invention described herein, the storage location is a storage replication log (such as storage replication log 130A of FIG. 1A to which data are written in action 1A.3), although the storage replication log can be any form of intermediate storage that preserves write ordering and tracks each update to primary data. Control proceeds to "Asynchronously Copy Updated Data to Primary Storage Area" step 230. Because the data were written to a log rather than to the primary storage volume directly in "Write Updated Data to Storage Location" step 220, the updated data are copied from the log to the primary storage area. Because the data are copied asynchronously, "Asynchronously Copy Updated Data to Primary Storage Area" step 230 alternatively can be performed at a later time.

Control then proceeds from "Asynchronously Copy Updated Data to Primary Storage Area" step 230 to "Update Information about Secondary Nodes to be Sent Update" step 240, where information is recorded to indicate the secondary nodes to which the update will be sent. Control then proceeds to "Replicate Updated Data to Secondary Nodes" step 250, where the data affected by the update are copied and transferred to respective secondary nodes (similar to the copying of data in FIG. 1C actions 1C.4.1, 1C.4.2, and 1C.4.3).

Control then proceeds to "Any Secondary Nodes Synchronous?" decision point 252, where a determination is made whether any of the secondary nodes is a synchronous node. If any node is synchronous, an acknowledgement must be received before the writer can be notified that the write operation is complete, and control returns to "Message?" decision point 210 to await another message. If all secondary nodes are asynchronous, control proceeds to "Notify Writer that Write Operation is Complete" step 260, and the writer of the update is notified that the write operation is complete. Control then returns to "Message?" decision point 210 to await another message.

At "Primary or Secondary" decision point 212, if the node is a secondary node, control proceeds to "Write Updated Data to Log" step 214. The updated data are written to a log on the secondary node. Control then proceeds to "Asynchronously Copy Updated Data from Log to Secondary Storage Area" step 216. The updated data are copied from the log on the secondary node to the secondary storage area. Because the data are copied asynchronously, "Asynchronously Copy Updated Data to Primary Storage" step 216 alternatively can be performed at a later time. Control then proceeds to "Acknowledge Receipt of Update to Primary Node" step 218, where an acknowledgement message is sent by the secondary node to the primary node, acknowledging the particular update received. Control then returns to "Message?" decision point 210 to await another message.

If at "Message?" decision point 210, the replication facility receives an acknowledgement of an update from a secondary node, the receiving instance of the replication facility is operating on a primary node, and control proceeds to "Update Information about Secondary Nodes Receiving Update" step 270. For example, having just received an acknowledgement, the replication facility can set an indicator that an acknowledgement has been received for the acknowledged update. Control then proceeds to "Synchronous Node" decision point 272, where a determination is made whether the node from which the acknowledgement was received is a synchronous node. If so, control proceeds to "Acknowledgements Received from All Synchronous Nodes?" decision point 274, where a determination is made whether all synchronous nodes have acknowledged the update. If so, control proceeds to "Notify Writer that Write Operation is Complete" step 276, and the writer of the update is notified that the write operation is complete. As described above, when an update is sent to one or more synchronous nodes, an acknowledgement must be received from each synchronous secondary node before the writer can be informed that the write operation is complete. The functionality of "Notify Writer that Write Operation is Complete" step 260 and "Notify Writer that Write Operation is Complete" step 274 is the same, and these two steps can be implemented by the same module. However, from "Notify Writer that Write Operation is Complete" step 276 (i.e., after receiving an acknowledgement from a synchronous node and notifying the application initiating the original update that the update is complete), control proceeds to "All Secondary Nodes Received Update?" decision point 280, which is discussed in further detail below.

If at "Acknowledgements Received from All Synchronous Nodes?" decision point 274, all synchronous nodes have not acknowledged the update, the writer cannot be notified that the write operation is complete. Control returns to "Message?" decision point 210, where the replication facility awaits another message.

If at "Synchronous Node" decision point 272, the acknowledging node is not a synchronous node, control proceeds to "All Secondary Nodes Received Update?" decision point 280.

At "All Secondary Nodes Received Update?" decision point 280, if all secondary nodes have received the update (e.g., all secondary nodes have acknowledged the update), control proceeds to "Notify All Secondary Nodes to Clear Update from Log" step 285. In one embodiment, notifying the secondary nodes includes sending a message to a counterpart replication facility instance running on the secondary nodes, and the counterpart replication facility instance clears the update from the log. As a result of clearing the update from the log, the log indicates that the particular update is completed on that secondary node.

One of skill in the art will recognize that the notification to clear the log entry for the update can be sent immediately upon receipt of all acknowledgements, or the notification can be delayed and "piggybacked" with other messages being sent to secondary nodes to minimize network traffic. For example, the primary node may delay notification of a given secondary node until the primary node has another data update to send to that given secondary node. In addition, notification messages may be batched together into one message; for example, a notification for two updates to two different storage areas can be sent in a single message to minimize network traffic.

If at "All Secondary Nodes Received Update?" decision point 280, all nodes have not yet acknowledged the update, outstanding acknowledgements remain for the given update. Control returns to "Message?" decision point 210, where the replication facility awaits another message.

If at "Message?" decision point 210, the replication facility receives a notification from a primary node to clear the log, the instance of the replication facility is operating on a secondary node. Control proceeds to "Complete Write Operation (if necessary) and Clear Update from Log" step 290. If the update remains in the log and has not yet been committed to a secondary storage area on the respective secondary node, the update is committed to secondary storage and the write operation is completed with respect to that secondary node. The write operation should be completed on the current secondary node before the log entry is cleared. The given update is cleared from the log, indicating that the update has been made on that secondary node and acknowledged by all secondary nodes, and control returns to "Message?" decision point 210, where the replication facility awaits another message.

Referring back to FIGS. 1A through 1C, storage replication log 130A is used on primary node 110A for logging writes so that writes can be asynchronously written to storage area 140A on primary node 110A. As described above, the application generating the write operation, such as file system 115A of FIG. 1A, can be notified that the write is complete as soon as data are written in storage replication log 130A (e.g., after action 1A.3 of FIG. 1A is complete).

In the embodiment described herein, storage replication logs are maintained on both the primary and secondary nodes. The receipt of data from the primary node is acknowledged when the secondary node completes writing the data to a respective storage replication log. Data are written asynchronously from the storage replication logs on the secondary nodes to storage volumes on the secondary nodes, such as storage area 140B on secondary node 110B of FIG. 1A.

Figure 3A:
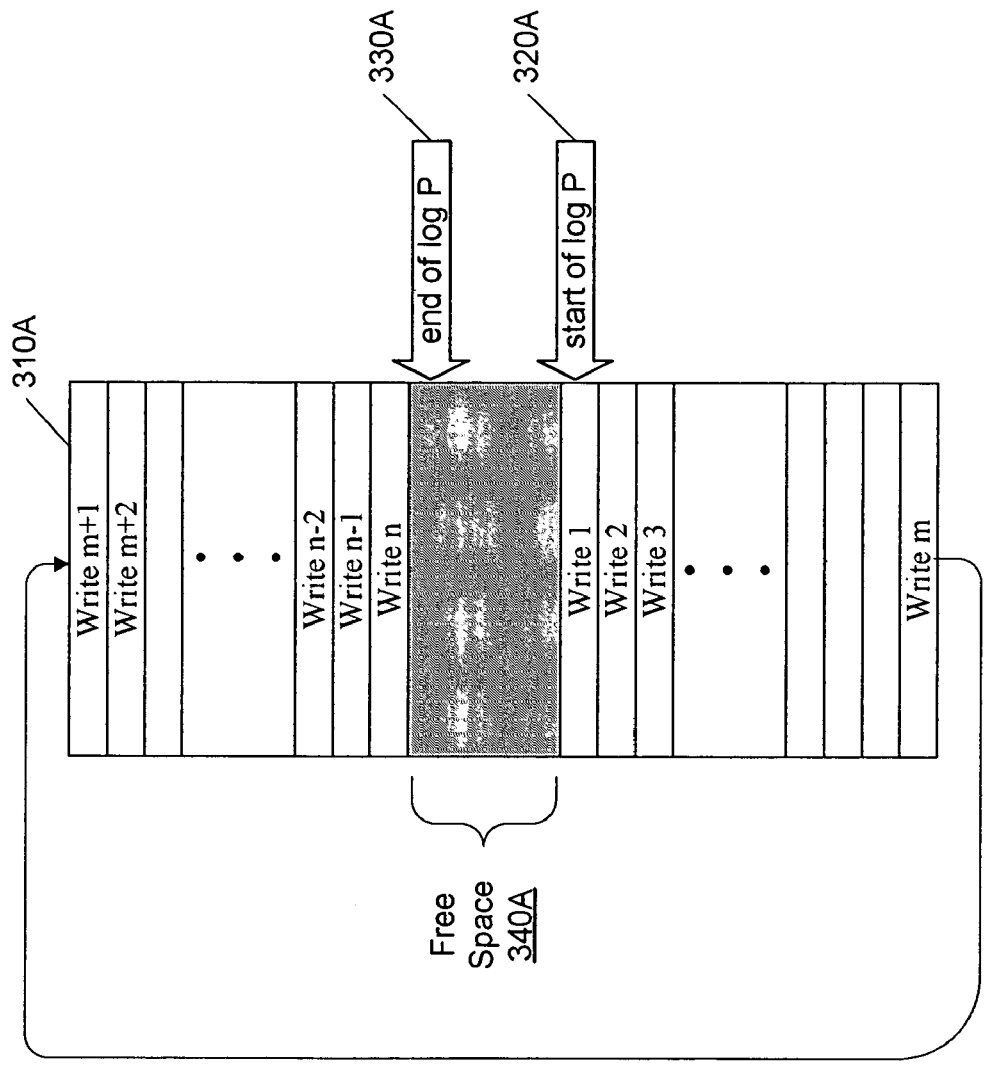
FIG. 3A is an example of one embodiment of a storage replication log used by the present invention.

FIG. 3A is an example of one embodiment of a storage replication log used by the present invention. Storage replication log 310A is a log of updates to data on the primary node (not shown) that are replicated to secondary nodes. In the embodiment shown in FIG. 3A, storage replication log 310A is implemented as a circular buffer.

In FIG. 3A, the first write operation is write operation 1, and the corresponding update to data is written to the location which also represents the start of the log. On the primary node P, a 'start of log' pointer 320A initially points to the location in storage replication log 310A containing the data for the next write operation/update that is to be sent to secondary nodes. After the update has been sent to secondary nodes, the 'start of log' pointer 320A is not changed until that update has been acknowledged by all secondary nodes. None of the data resulting from write operations has yet been replicated to and acknowledged by all secondary nodes. Write operations 2 and 3 follow write operation 1, until the update resulting from write operation m is written to the bottom location in storage replication log 310A. Because storage replication log 310A is circular, the update resulting from the following write operation, write operation m+1, is written to the top location in storage replication log 310A. Updates resulting from write operation m+2 through write operation n follow, with the update resulting from write operation n being the last entry written to storage replication log 310A.

An 'end of log' pointer 330A points to the location in storage replication log 310A to which the next write operation, write operation n+1 (not shown), will be logged. The log locations between 'end of log' pointer 330A and 'start of log' pointer 320A are free space 340A. 'End of log' pointer 330A points to the first location in free space 340A. When all nodes have acknowledged receipt of the update resulting from write operation 1, 'start of log' pointer 320A is incremented (not shown) to point to the location containing the update resulting from write operation 2. The location formerly containing the update resulting from write operation 1 becomes a part of free space 340A and can be overwritten by subsequent write operations. As each update resulting from each write operation is acknowledged by all secondary nodes, the respective update location in storage replication log 310A is "cleared" so that location in storage replication log 310A can be returned to the free space and reused.

Figure 3B:
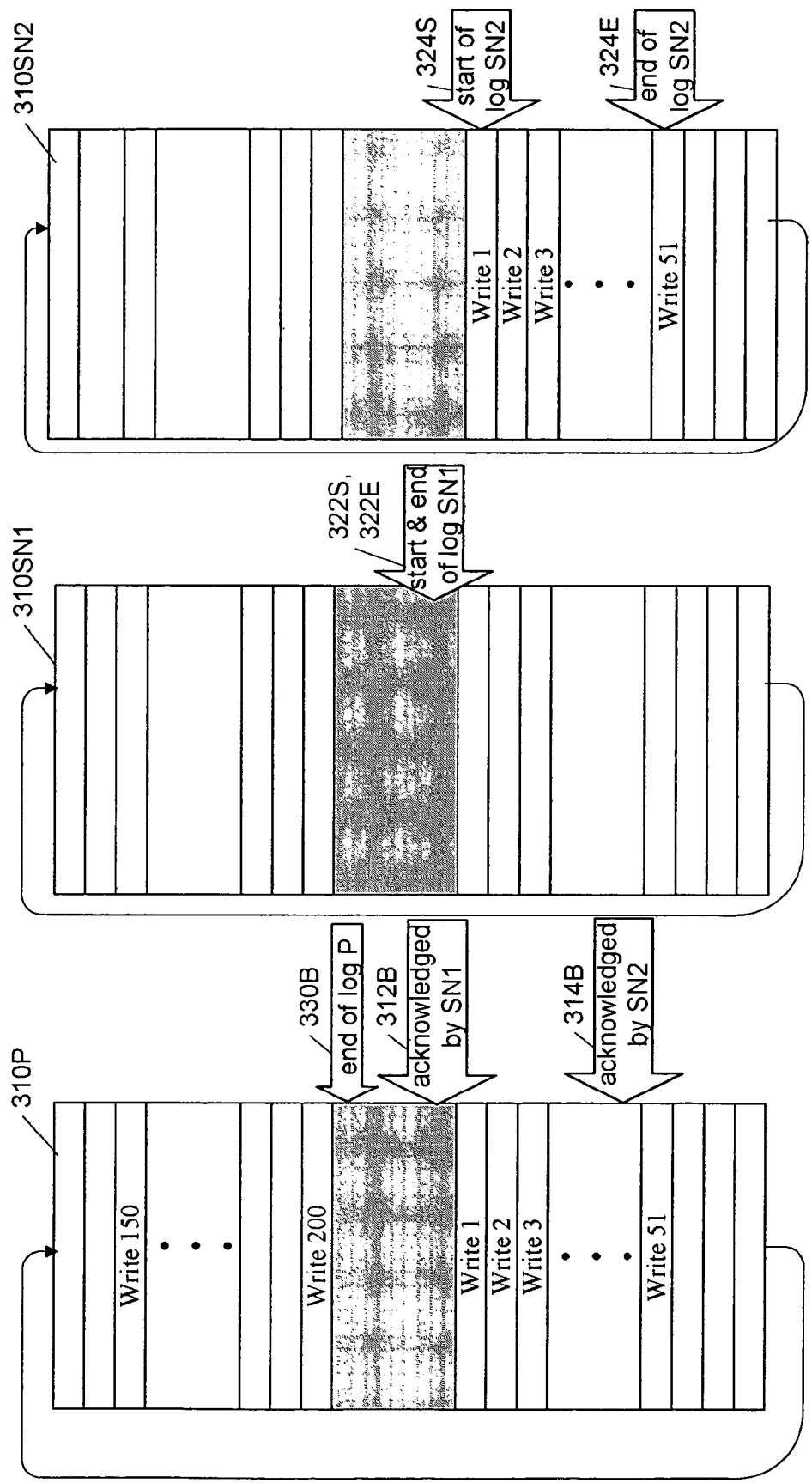
FIG. 3B shows the storage replication log of FIG. 3A with secondary storage replication logs for two secondary nodes.

FIG. 3B shows storage replication log 310P on a primary node P (not shown) and secondary storage replication logs 310SN1 and 310SN2 for secondary nodes SN1 and SN2 (also not shown). Two hundred write operations have been written to storage replication log 310P for primary node P, and the 'end of log' pointer 330B points to the location immediately following the location for write operation 200. The log 310P for primary node P shows that no updates have been acknowledged by secondary node SN1, as indicated by pointer 312B. The updates resulting from write operations 1 through 50 have been acknowledged by secondary node SN2, as indicated by pointer 314B.

Secondary node log 310SN1 shows a 'start of log' pointer 322S and an 'end of log' pointer 322E. Either no updates have been sent to secondary node SN1, or secondary node SN1 has not acknowledged any of the updates received. Secondary node SN1 is therefore 200 write operations behind primary node P. Furthermore, no notifications have been received by secondary node SN1 indicating that all secondary nodes have acknowledged an update.

Secondary node log 310SN2 shows a 'start of log' pointer 324S and an 'end of log' pointer 324E. 'Start of log' pointer 324B points to write operation 1, indicating the next location to be sent and/or for which a notification of acknowledgements is awaited by secondary node SN2. Because secondary node SN1 has acknowledged no updates, the 'start of log' pointer 324S for secondary node SN2 remains pointing to the location for the first write operation. Updates resulting from write operations 1 through 50 have been replicated to secondary node SN2 and the end of log pointer 324E points to the next location in log 31 0SN2 in which the update resulting from the next write operation, write operation 51, will be recorded. Secondary node SN2 is 150 write operations behind the primary node P. If the 'end of log' pointer were to reach the 'start of log' pointer for any secondary node, the storage replication log for that secondary node would "overflow," indicating that the storage replication log has no free space. Locations containing updates that are not yet synchronized on all secondary nodes are in danger of being overwritten.

With synchronous replication, all secondary nodes are typically up-to-date. The 'start of log' and 'end of log' pointers of synchronous nodes are separated by the number of simultaneous I/O operations that the application writing the data performs. For asynchronous replication, the difference between the 'start of log' pointer for the secondary node and the 'end of log' pointer for the primary node reflects the number of outstanding write operations that has yet to be processed. In other words, the difference between the 'start of log' pointer for the secondary node and the 'end of log' pointer for the primary node indicates the number of write operations that the secondary node is behind the primary node. Different secondary nodes usually have 'start of log' pointers indicating different locations in the primary replication log. The different locations indicate the differences in the rate at which data are sent to each secondary node.

Figure 4A:
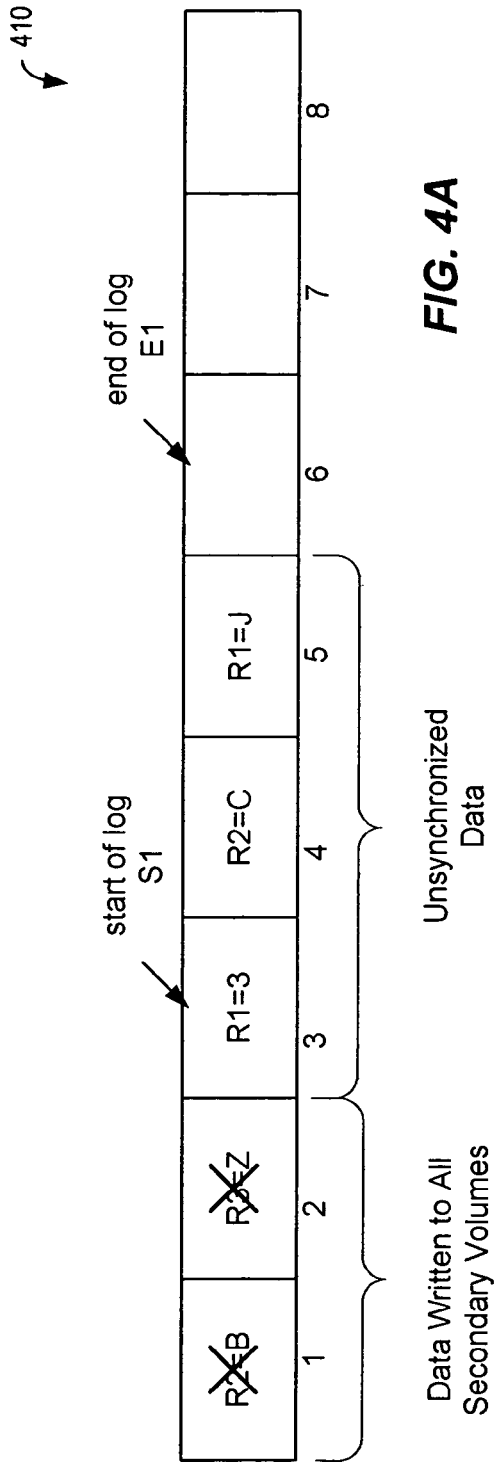
FIG. 4A is a diagram of a storage replication log containing data that are to be written to a storage volume using synchronous or asynchronous replication.

FIG. 4A is a diagram of a storage replication log 410 containing data that are being replicated to a storage volume, such as storage area 140B of FIG. 1A. Storage replication log 410 is shown as having 'start of log' pointer S1 and 'end of log' pointer E1. 'End of log' pointer E1 indicates the location in storage replication log 410 to which the update resulting from the next write operation will be logged. 'Start of log' pointer S1 indicates the location of storage replication log 410 that will be cleared, or added to free space that can be overwritten, when a notification is received that all secondary nodes have acknowledged the update.

The first two locations of storage replication log 410 formerly contained updates that have been written to all secondary data volumes, as indicated by the X marking through the data values. Each update in log 410 shows a value for a given region of the data to be updated, although the log entries need not correspond to regions of a fixed size. For example, an update may specify a beginning address within a storage area (sometimes referred to as an "offset") and a length for the amount of data to be written. It is within the scope of the invention that updates in the log can be of varying sizes.

In log 410, the third through fifth locations (the locations between the 'start of log' pointer S1 and 'end of log' pointer E1) indicate unsynchronized updates, not yet having been acknowledged by all secondary nodes. The sixth through eighth locations will hold updates resulting from future write operations. In the example shown in FIG. 4A, 'start of log' pointer S1 points to the third location, containing an update to data for region 1 with a value of "3." Assume that the secondary node hosting storage replication log 410 then receives a notification from the primary node that all secondary nodes have acknowledged the update (indicating that all secondary nodes have a value of "3" for region 1).

When the secondary node receives the notification from the primary node that all secondary nodes have received the update, the secondary node checks whether the data from the update have been written to the storage volume. If not, the data are copied from the location pointed to by the 'start of log' pointer (i.e., the third location in storage replication log 410 with data having the value of "3") to a storage volume on the secondary node. In one embodiment, a secondary node might have written the data from a storage replication log to a storage volume prior to receiving a notification from the primary node that all secondary nodes have received the update. However, the 'start of log' pointer is not changed until the notification is received.

Figure 4B:
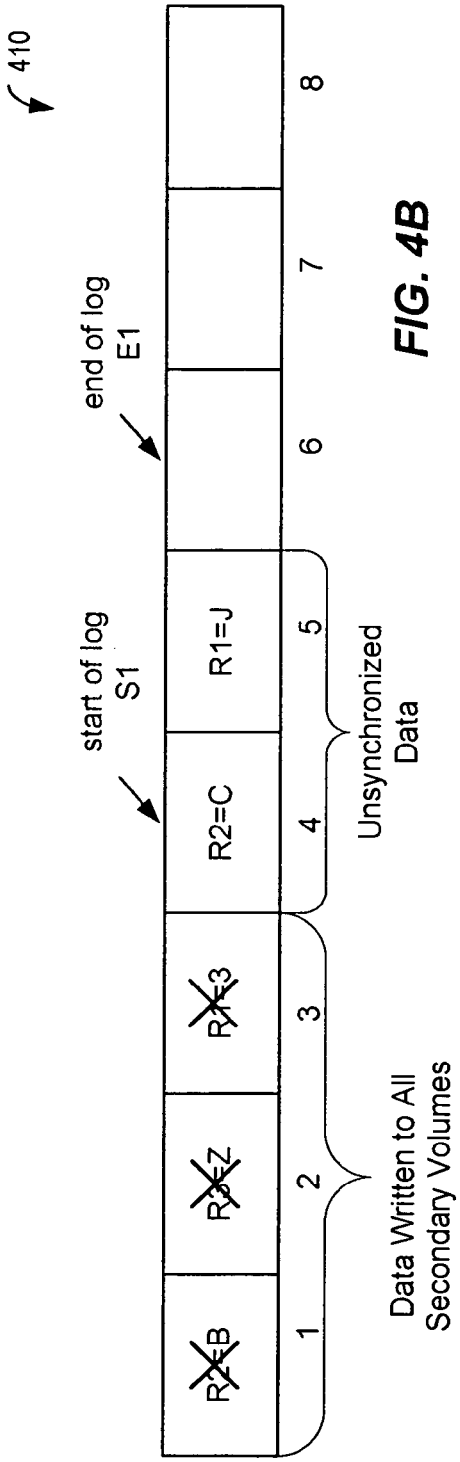
FIG. 4B is a diagram of the storage replication log of FIG. 4A after notification is received that the update has been received by all secondary nodes.

FIG. 4B is a diagram of storage replication log 410 after notification is received that the update in the third location of storage replication log 410 has been acknowledged by all secondary nodes. When the notification is received, the 'start of log' pointer is incremented or moved to point to the location of the next update that will be written to the storage volume, in this example, the fourth location of storage replication log 410. At this point in time, the data written to storage volumes on all secondary nodes include the first through third locations of storage replication log 410. The data that are not currently synchronized with other secondary volumes are contained in the fourth and fifth locations of storage replication log 410.

At this point in time, if the primary node were to fail, a secondary node is selected to assume the functionality provided by the former primary node. Data in the locations between the 'start of log' and 'end of log' pointers of the storage replication log of the most recently updated secondary node identify the updates that may be unsynchronized with the other secondary nodes. In the example using storage replication log 410 of FIG. 4B as the most recent secondary node, only updates in the fourth and fifth locations of the log become eligible to be copied to the other secondary nodes to synchronize all of the data. In this example, the maximum number of updates to synchronize other secondary nodes is two, but all secondary nodes may not need both locations to be synchronized. For example, if a given secondary node has cleared the fourth location, only the update represented by the fifth location of the log is eligible to be copied to that given secondary node.

Figure 5A:
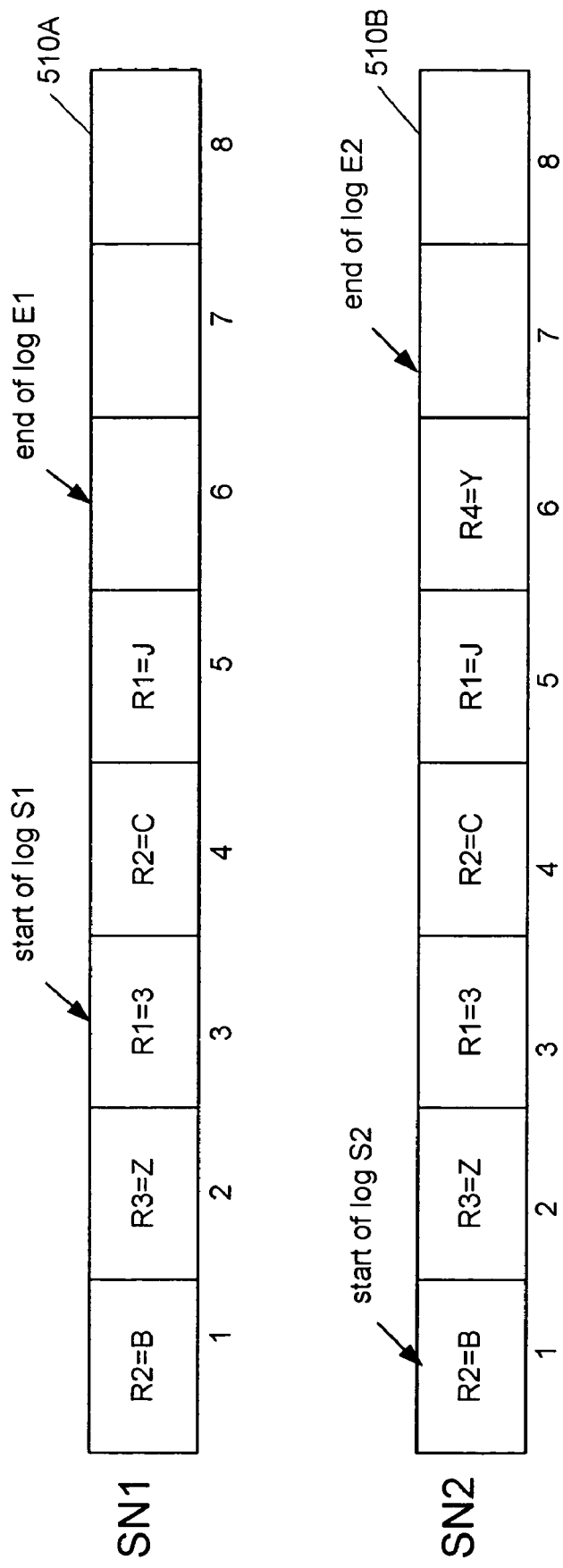
FIG. 5A is a diagram showing the use of logs to identify selected updates to perform to synchronize secondary nodes that are unsynchronized.

FIG. 5A is a diagram showing the use of logs to identify selected updates to perform to synchronize secondary nodes that are unsynchronized. Log 510A for secondary node SN1 shows a 'start of log' pointer S1 to the third location of log 510A and an 'end of log' pointer E1 to the sixth location. Log 510B for secondary node SN2 shows a 'start of log' pointer S2 to the first location of log 510B and an 'end of log' pointer E2 to the seventh location. Secondary node SN2 has received one write operation from the primary node that has not yet been received by secondary node SN1. In this example, the update of "R4=Y" in log 510B location 6 indicates that secondary node SN2 is ahead of secondary node SN1. Secondary node SN1 is awaiting notification that all secondary nodes have acknowledged the updates represented by the third, fourth, and fifth locations of log 510A, and secondary node SN2 is awaiting notification that all secondary nodes have acknowledged the updates represented by the first through sixth locations of log 510B.

The fact that two secondary nodes (in this example, secondary nodes SN1 and SN2) have different 'end of log' pointer values indicates that one of the secondary nodes has received updates that the other secondary node has not. To synchronize secondary node SN2 with secondary node SN1, updates that have been made to the most recent secondary node SN2 but not to secondary node SN1 can be identified. In this example, the difference between the end of log pointers E2 and E1 indicate the locations in logs 510A and 510B that are unsynchronized. To synchronize secondary nodes SN1 and SN2, the updates represented by the sixth location of log 510B ("R4=Y") can be applied to secondary node SN1.

Figure 5B:
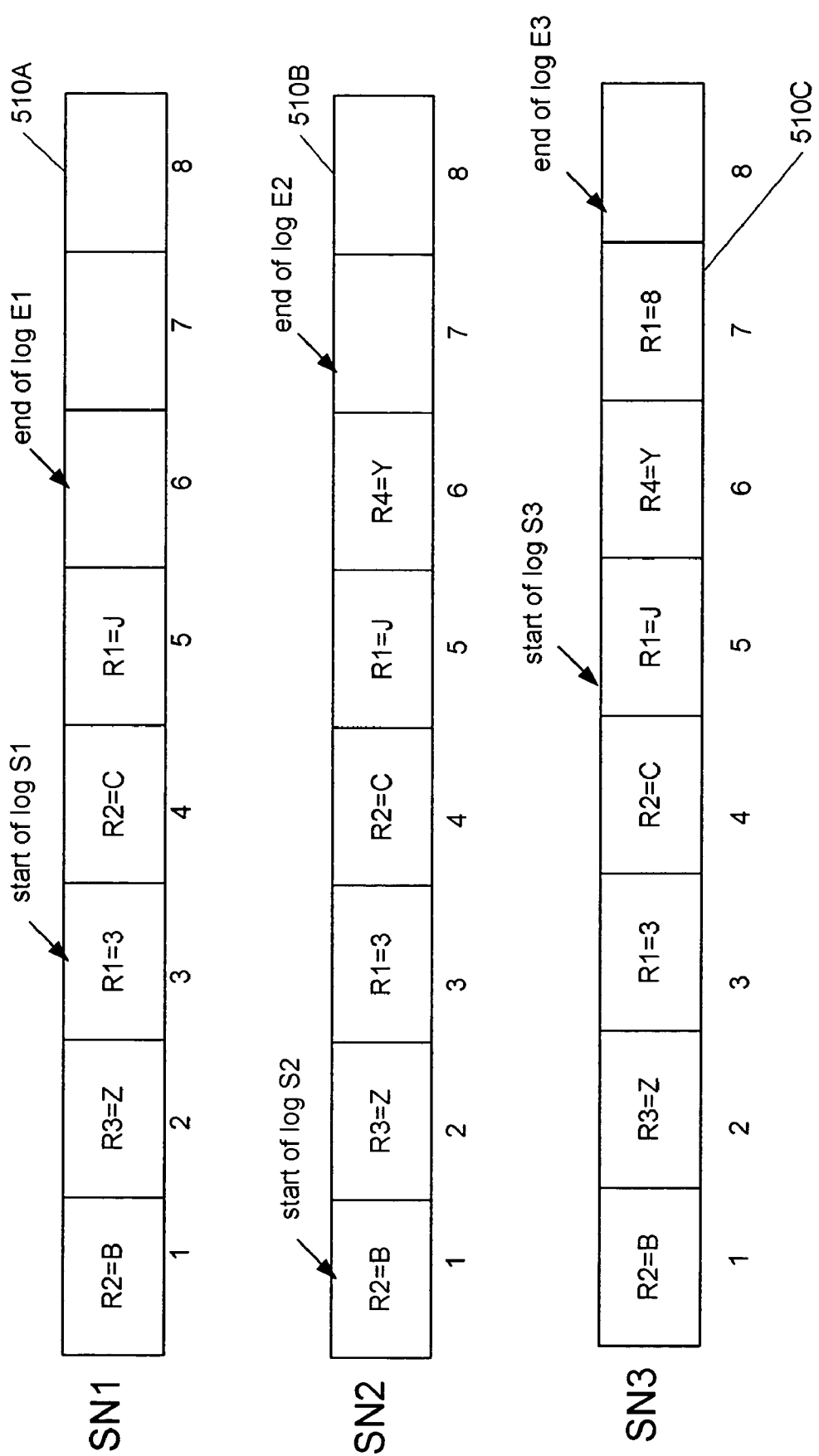
FIG. 5B is another diagram showing the use of logs to identify selected updates to perform to synchronize secondary nodes that are unsynchronized.

FIG. 5B is another diagram showing the use of logs to identify selected updates to perform to synchronize secondary nodes that are unsynchronized. Logs 510A and 510B for respective secondary nodes SN1 and SN2 are the same as described for FIG. 5A. Log 510C for secondary node SN3 shows a 'start of log' pointer S3 to the fifth location of log 510C and an 'end of log' pointer E3 to the eighth location of log 510C. Secondary node SN3 has received an additional update from the primary node that secondary node SN2 has not yet received and can be considered to be the most recently-updated secondary node.

To synchronize secondary node SN1 with secondary node SN3, the updates represented by the sixth and seventh locations of log 510C can be applied to the data on secondary node SN1; i.e., the differences between 'end of log' pointers E1 and E3 can be identified. To synchronize secondary node SN2 with secondary node SN3, the updates represented by the seventh location of log 510C can be applied to the data on secondary node SN2.

The invention operates by tracking nodes to which updates are sent between points in time at which all of the primary and secondary volumes are synchronized. The invention also tracks nodes acknowledgements received for each update since the last synchronization of all primary and secondary nodes. This information enables regions that are unsynchronized to be quickly identified and synchronized, greatly reducing the time required for failover.

The functionality for performing replication and failover described herein can be implemented in a multi-node environment using a variety of computer systems and networks. An example of one such computing environment is described below with reference to FIG. 6.

An Example Computing and Network Environment

Figure 6:
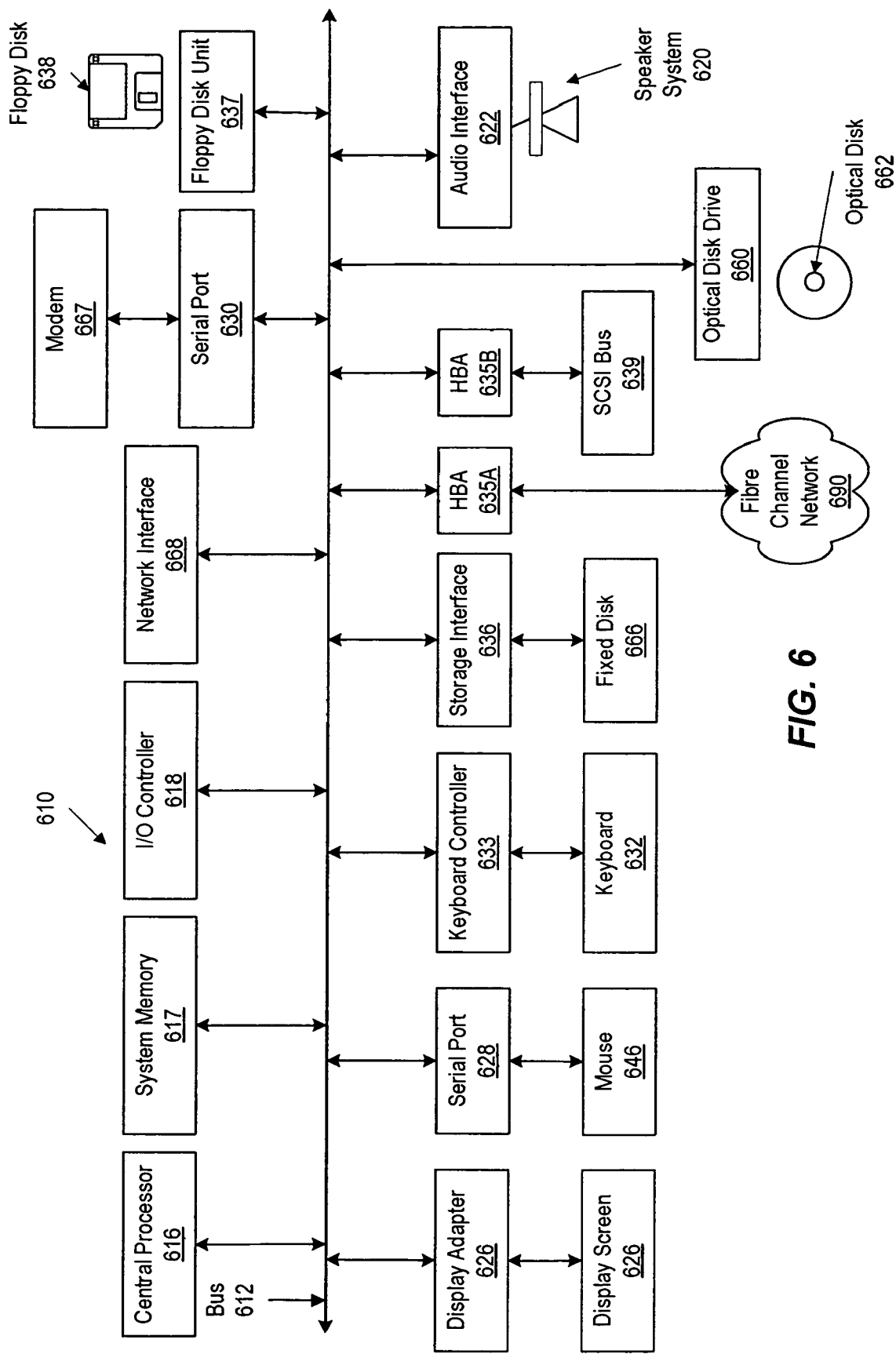
FIG. 6 shows an example of a computer system that can be used to operate the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), floppy disk unit 637 or other storage medium. Additionally, applications may be in the form of electronic signals modulated in accordance with the application and data communication technology when accessed via network modem 647 or interface 648.

Storage interface 634, as with the other storage interfaces of computer system 610, may connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 6 to be present to practice the present invention. The devices and subsystems may be interconnected in different ways from that shown in FIG. 6. The operation of a computer system such as that shown in FIG. 6 is readily known in the art and is not discussed in detail in this application. Code to implement the present invention may be stored in computer-readable storage media such as one or more of system memory 617, fixed disk 644, optical disk 642, or floppy disk 638. Additionally, computer system 610 may be any kind of computing device, and so includes personal data assistants (PDAs), network appliances, X-window terminals or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Explorer®, and the like.

Other Embodiments

Replication facilities 120A, 120B, 120C and 120D of FIGS. 1A through 1C are examples of one implementation of the functionality performed by the present invention. One of skill in the art will recognize that the functionality described for the replication facility described herein may be performed by various modules, instructions, and/or other means of providing the functionality. For example, an identifying module, means, or instructions may be used to identify secondary nodes to which an update to data is sent. Each secondary node inserts the update into a respective log for a respective copy of the data in response to receiving the update. A sending module, means, or instructions may be used to send a notification to each of the secondary nodes that the update is complete and the respective log entries can be cleared when all of the secondary nodes have acknowledged the update. Other configurations to perform the same functionality are within the scope of the invention.

The replication processes described herein have referred to asynchronous or synchronous replication. It is within the scope of the invention that other forms of replication can be used, as long as modifications to data are made consistently. For example, a form of periodic replication in which all updates are distributed to secondary nodes at a fixed time interval can be used in conjunction with the present invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of fomms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   identifying a plurality of secondary nodes;
   sending an update from a primary node to the plurality of secondary nodes, wherein
      the update identifies at least one secondary node of the plurality of secondary nodes to which the update will be sent;
   in response to receiving the update from the primary node, causing the at least one secondary node to insert the update in a respective log of updates, wherein
      each of the respective log of updates corresponds to a respective copy of the data, and
      the inserting the update in the respective log of updates is performed at the secondary node;
   in response to inserting the update in the respective log of updates, causing the update to be copied from the respective log of updates to a storage area at the least one secondary node;
   sending an acknowledgement from the at least one secondary node to the primary node, wherein
      the acknowledgement indicates that the update has been received at the least one secondary node;
   determining that all of the plurality of secondary nodes have acknowledged the update; and
   in response to the determining, causing each secondary node of the at least one secondary node to clear the update from the respective log of updates by sending a notification to each of the plurality of secondary nodes once all of the plurality of secondary nodes have acknowledged the update, wherein
   the clearing is performed in response to receiving the notification.

2. The method of claim 1 wherein
   the clearing the update from the respective log comprises updating a start-of-log pointer in the respective log.

3. The method of claim 1 wherein
   the clearing the update from the respective log comprises updating a pointer to a location in the respective log, wherein
      the pointer points to the location if the location contains a next update to clear.

4. The method of claim 1 further comprising:
   determining that a location of a next update in a first respective log of updates to a first respective copy of the data at a first secondary node of the secondary nodes differs from a corresponding location of the next update in a second respective log of updates to a second respective copy of the data at a second secondary node of the secondary nodes; and
   identifying a set of updates in the first respective log, wherein each update of the set of updates is not in the second respective log; and
   synchronizing the first respective copy and the second respective copy by applying the set of updates to the second respective copy.

5. The method of claim 4 wherein
   the determining occurs when a primary node maintaining the data fails.

6. The method of claim 1 further comprising:
   setting a sent indicator for the update for one of the plurality of secondary nodes when the update is sent to the one secondary node.

7. The method of claim 6 further comprising:
   setting a received indicator for the update for the one secondary node when an acknowledgement of the update is received from the one secondary node.

8. The method of claim 7 wherein
   the sending the notification to each of the plurality of secondary nodes comprises determining that a respective sent indicator and a respective received indicator for the update are set for each of the plurality of secondary nodes.

9. The method of claim 1, further comprising:
   in response to the identifying, incrementing a regional counter stored on the primary node by a number of secondary nodes to which the update is sent, wherein
      the regional counter is a number of secondary nodes from which an acknowledgement to the update is to be received;
   in response to receiving an acknowledgement from a secondary node among the plurality of secondary nodes to which the update is sent, decrementing the regional counter; and
   in response to the regional counter reaching a value prior to the incrementing, determining that each of the plurality of secondary nodes has acknowledged the update.

10. A computer-readable storage medium having a plurality of instructions embodied therein, wherein the plurality of instructions are executable for:
   identifying instructions to identify a plurality of secondary nodes; sending an update from a primary node to the plurality of secondary nodes, wherein
      the update identifies at least one secondary node of the plurality of secondary nodes to which the update will be sent;
   in response to receiving the update from the primary node, causing the at least one secondary node to insert the update in a respective log of updates, wherein
      each of the respective log of updates corresponds to a respective copy of the data, and
      the inserting the update in the respective log of updates is performed at the secondary node;
   in response to inserting the update in the respective log of updates, causing the update to be copied from the respective log of updates to a storage area at the least one secondary node;
   sending an acknowledgement from the at least one secondary node to the primary node, wherein
      the acknowledgement indicates that the update has been received at the least one secondary node;
   determining that all of the plurality of secondary nodes have acknowledged the update; and
   in response to the determining, causing each secondary node of the at least one secondary node to clear the update from the respective log of updates by sending instructions to send a notification to each of the plurality of secondary nodes once all of the plurality of secondary nodes have acknowledged the update, wherein
the clearing is performed in response to receiving the notification.

11. The computer-readable storage medium of claim 10 wherein the clearing instructions further comprise
updating instructions to update a start-of-log pointer in the respective log.

12. The computer-readable storage medium of claim 10 wherein the clearing instructions further comprise
updating instructions to update a pointer to a location in the respective log, wherein
the pointer points to the location if the location contains a next update to clear.

13. The computer-readable storage medium of claim 10 further comprising:
determining instructions to determine that a location of a next update in a first respective log of updates to a first respective copy of the data at a first secondary node of the secondary nodes differs from a corresponding location of the next update in a second respective log of updates to a second respective copy of the data at a second secondary node of the secondary nodes; and
second identifying instructions to identify a set of updates in the first respective log, wherein
each update of the set of updates is not in the second respective log; and
synchronizing instructions to synchronize the first respective copy and the second respective copy by applying the set of updates to the second respective copy.

14. The computer-readable storage medium of claim 10, further comprising:
incrementing instructions to increment a regional counter stored on the primary node by a number of secondary nodes to which the update is sent, in response to the identifying, wherein
the regional counter is a number of secondary nodes from which an acknowledgement to the update has not been received;
decrementing instructions to decrement the regional counter, in response to receiving an acknowledgement from a secondary node among the plurality of secondary nodes to which the update is sent; and
determining instructions to determine that each of the plurality of secondary nodes has acknowledged the update.

15. A computer system comprising:
a processor for executing instructions, and
a memory to store the instructions, wherein the instructions comprise
identifying instructions to identify a plurality of secondary nodes to which an update to data is sent from a primary node, wherein
the update identifies at least one secondary node of the plurality of secondary nodes to which the update will be sent;
in response to receiving the update from the primary node, causing the at least one secondary node to insert the update in a respective log of updates to a respective copy of the data, wherein
each of the respective log of updates corresponds to a respective copy of the data, and
the inserting the update in the respective log of updates is performed at the secondary node;
in response to inserting the update in the respective log of updates, causing the update to be copied from the respective log of updates to a storage area at the least one secondary node;
sending an acknowledgement from the at least one secondary node to the primary node, wherein
the acknowledgement indicates that the update has been received at the least one secondary node;
determining that all of the plurality of secondary nodes have acknowledged the update; and
in response to the determining, causing each secondary node of the at least one secondary node to clear the update from the respective log of updates by sending instructions to send a notification to each of the plurality of secondary nodes when all of the plurality of secondary nodes have acknowledged the update, wherein
the clearing is performed in response to receiving the notification.

16. The computer system of claim 15 wherein the instructions further comprise
determining instructions to determine that a location of a next update in a first respective log of updates to a first respective copy of the data at a first secondary node of the secondary nodes differs from a corresponding location of the next update in a second respective log of updates to a second respective copy of the data at a second secondary node of the secondary nodes; and
second identifying instructions to identify a set of updates in the first respective log, wherein
each update of the set of updates is not in the second respective log; and
synchronizing instructions to synchronize the first respective copy and the second respective copy by applying the set of updates to the second respective copy.

17. The computer system of claim 15, wherein the instructions further comprise:
incrementing instructions to increment a regional counter stored on the primary node by a number of secondary nodes to which the update is sent, in response to the identifying, wherein
the regional counter is a number of secondary nodes from which an acknowledgement to the update has not been received;
decrementing instructions to decrement the regional counter, in response to receiving an acknowledgement from a secondary node among the plurality of secondary nodes to which the update is sent; and
determining instructions to determine that each of the plurality of secondary nodes has acknowledged the update.

* * * * *